(12) United States Patent
Ruppel

(10) Patent No.: US 9,080,477 B2
(45) Date of Patent: Jul. 14, 2015

(54) OIL MIST SEPARATOR

(75) Inventor: Stefan Ruppel, Heidelberg Emmertsgrund (DE)

(73) Assignee: Mahle International GmbH (DE)

( * ) Notice: Subject to any disclaimer, the term of this patent is extended or adjusted under 35 U.S.C. 154(b) by 758 days.

(21) Appl. No.: 13/377,454

(22) PCT Filed: May 28, 2010

(86) PCT No.: PCT/EP2010/057463
§ 371 (c)(1),
(2), (4) Date: Mar. 9, 2012

(87) PCT Pub. No.: WO2010/142544
PCT Pub. Date: Dec. 16, 2010

(65) Prior Publication Data
US 2012/0159912 A1 Jun. 28, 2012

(30) Foreign Application Priority Data

Jun. 12, 2009 (DE) .......................... 10 2009 024 701

(51) Int. Cl.
*B01D 45/08* (2006.01)
*F01M 13/04* (2006.01)
(Continued)

(52) U.S. Cl.
CPC .............. *F01M 13/04* (2013.01); *B01D 45/08* (2013.01); *B01D 45/10* (2013.01); *B01D 46/003* (2013.01); *F01M 2013/0433* (2013.01); *F01M 2013/0438* (2013.01)

(58) Field of Classification Search
CPC ...... F01M 13/04; Y10T 436/25; B01D 45/08; C04B 41/009; F02M 25/06
USPC ......... 55/462, 385.3, 465, 445–446, DIG. 14, 55/DIG. 19, 320, 327, 329; 123/198 E, 572, 123/573, 41.86, 574; 96/410–412
See application file for complete search history.

(56) References Cited

U.S. PATENT DOCUMENTS 6,290,738 B1 9/2001 Holm
6,797,040 B2 9/2004 Lenzing
(Continued)

FOREIGN PATENT DOCUMENTS

AT 275007 T 9/2004
DE 1544126 A1 6/1969
(Continued)

OTHER PUBLICATIONS

English abstract for FR-2913054.
(Continued)

*Primary Examiner* — Dung H Bui
(74) *Attorney, Agent, or Firm* — Fishman Stewart Yamaguchi PLLC

(57) ABSTRACT

An oil mist separator for a crankcase ventilation system in an internal combustion engine is disclosed. The oil mist separator is an impact type separator that includes a nozzle device having at least one nozzle, an impact wall and a separation material configured therebetween. The impact wall is located opposite to the at least one nozzle and may be coated with the separation material. A distance is configured between the nozzle and the separation material, and is reduced compared to a surrounding region, and wherein the separation material in a region of the opposing nozzle projects towards the same and thereby reduces the distance of a nozzle outlet to the separation material in this region compared to the surrounding region.

18 Claims, 1 Drawing Sheet

(51) Int. Cl.
  *B01D 45/10* (2006.01)
  *B01D 46/00* (2006.01)

(56) References Cited

U.S. PATENT DOCUMENTS

| | | | |
|---|---|---|---|
| 7,655,073 | B2 | 2/2010 | Evenstad et al. |
| 2003/0047074 | A1* | 3/2003 | Liu et al. .................. 95/268 |
| 2004/0069035 | A1 | 4/2004 | Bourgon et al. |
| 2008/0047519 | A1 | 2/2008 | Naito et al. |
| 2009/0025662 | A1 | 1/2009 | Herman et al. |
| 2010/0229510 | A1 | 9/2010 | Heinen et al. |
| 2010/0242632 | A1* | 9/2010 | Call .................. 73/863.22 |
| 2010/0294218 | A1 | 11/2010 | Ruppel et al. |

FOREIGN PATENT DOCUMENTS

| | | |
|---|---|---|
| DE | 3826684 A1 | 2/1990 |
| DE | 10051307 A1 | 5/2002 |
| DE | 102005043198 A1 | 3/2006 |
| DE | 102004049089 A1 | 4/2006 |
| DE | 102006024816 A1 | 12/2007 |
| DE | 202007014378 U1 | 2/2009 |
| EP | 0860589 A1 | 8/1998 |
| FR | 2913054 A1 | 8/2008 |
| GB | 1109693 A | 4/1968 |
| JP | S62198466 U | 12/1987 |
| JP | 09-291810 A | 11/1997 |
| JP | 2001-098920 A | 4/2001 |
| JP | 2008-050949 A | 3/2008 |
| JP | 2009-507157 A | 2/2009 |
| WO | WO-2007000281 A1 | 1/2007 |
| WO | WO-2007028351 A1 | 3/2007 |
| WO | WO-2008028863 A2 | 3/2008 |

OTHER PUBLICATIONS

English abstract for DE-3826684.
English abstract for DE-102004049089.
English abstract for JP-9291810.
Enderich, Andrea; Der neue Boxermotor für die BMW HP2 Sport; MTZ Motortechnische Zeitschrift, ISSN 0024-8525 10814, www.ATZonlien.de, Apr. 2008, Jg. 69, H.40, S. 320-S. 327, Bild 1, S. 322-Kap. 2. (12 pages).
First Office Action in Chinese dated Feb. 8, 2014 (no translation available).
Japanese Office Action for JP2012-514414 dated Jan. 5, 2014.
English abstract for JP2001-98920.
Japanese Office Action for JP 2012-514414, dated Aug. 19, 2014.

\* cited by examiner

OIL MIST SEPARATOR

CROSS-REFERENCES TO RELATED APPLICATIONS

This application claims priority to German patent application 10 2009 024 701.7 filed on Jun. 12, 2009 and PCT patent application PCT/EP2010/057463 filed on May 28, 2010, which are hereby incorporated by reference in their entirety.

TECHNICAL FIELD

The present invention relates to an oil mist separator designed as an impactor.

BACKGROUND

During the operation of internal combustion engines which, for example, can be arranged in motor vehicles, so-called blow-by gas gets through a leakage between pistons and cylinders into a crankcase of the respective internal combustion engine. In order to avoid an unacceptable overpressure in the crankcase or an undesirable emission of blow-by gases into the environment, so-called crankcase ventilation devices are used. Usually, such a ventilation device connects, by means of a vent line, the crankcase to an intake passage of the internal combustion engine in which, in particular downstream of a throttle valve, a relative negative pressure prevails which enables the blow-by gas accumulating in the crankcase to be sucked out of said crankcase. Furthermore, during the operation of the internal combustion engine, an oil mist is generated which is aerosolically dissolved and mixes with the blow-by gas. In order to reduce the oil consumption of the internal combustion engine and also the pollutant emission, usually an oil mist separator is used which separates the oil particles aerosolically dissolved in the blow-by gas and feeds said particles to an adequate oil reservoir. An increasing tightening of pollutant emission regulations requires a steady improvement of the cleaning effect of such oil mist separators.

From EP 0 860 589 B1, for example, an oil mist separator for a crankcase ventilation device is known which comprises a first and a second separator unit and a bypass valve.

SUMMARY

The present invention is concerned with the problem of providing an improved embodiment for an oil mist separator which is in particular characterized by a high separation rate.

This problem is solved according to the invention by the subject matter of the independent claim 1. Advantageous embodiments are subject matter of the dependent claims.

The present invention is based on the general idea to reduce in an oil mist separator, which is designed as an impactor and comprises a nozzle device having at least one nozzle and which further comprises an impact wall located opposite to said at least one nozzle, a distance between said nozzle and the impact wall. The impact wall usually is coated with a separation material, in particular a fleece or a knitted material, for increasing the separation effect. Of course, the nozzle device usually has a plurality of nozzles arranged next to each other which preferably all have a smaller distance in their outlet region to the separation material than between the individual nozzles. In general, it does not matter here in what way the distance reduction is achieved so that, for example, nozzles projecting in a volcano-like manner and/or separation material projecting in the region of the opposing nozzle towards the same, can be provided. The only thing important here is that by the reduced distance, in the region of the nozzles, between an outlet of the respective nozzle and the opposing separation material, a very strong flow deflection of the blow-by gas in the region of the nozzles is enforced, whereby a significantly improved separation rate can be achieved. Due to the particular type of design of the nozzles/separation material/impactor wall, the flow velocity is high only in the region downstream of the nozzle, which results in a good separation. In the further course, the flow slows down again. This has a positive influence on the differential pressure and the safety of the component. Due to the fact that usually a plurality of nozzles is provided, the blow-by gas ejected from the individual nozzle outlets is forced to flow through the separation material itself or to flow off via an intermediate space between the nozzle device and the separation material, wherein said intermediate space is rugged due to the reduced distances between the separation material and the nozzles opposing in each case, whereby also in this manner, blow-by gas flowing off has a lower flow velocity. As already mentioned, the reduced distance in the region of the nozzles between the nozzles and the opposing separation material can be achieved by nozzles projecting in the direction of the separation material and/or by separation material projecting in the direction of the nozzles. In particular, with such an oil mist separator according to the invention, a comparatively high efficiency along with high safety and low differential pressure can be achieved.

In an advantageous refinement of the solution according to the invention, the impact wall is formed by a valve member of a bypass valve. Thus, the impact wall usually closes the bypass valve which, at the same time, represents the nozzle so that here an oil mist separation can take place exclusively if the bypass valve opens. If this is the case, the latter acts as a nozzle and the opening valve plate which, for example, is coated with the separation material, acts as an impact wall. In a bypass valve configured in such a manner, even this can be used as an oil mist separator.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

BRIEF DESCRIPTION OF THE DRAWINGS

Preferred exemplary embodiments of the invention are illustrated in the drawings and are explained in the following description in more detail, wherein identical reference numbers refer to identical, or similar, or functionally identical components.

In the figures, schematically

DETAILED DESCRIPTION

Figure 1:
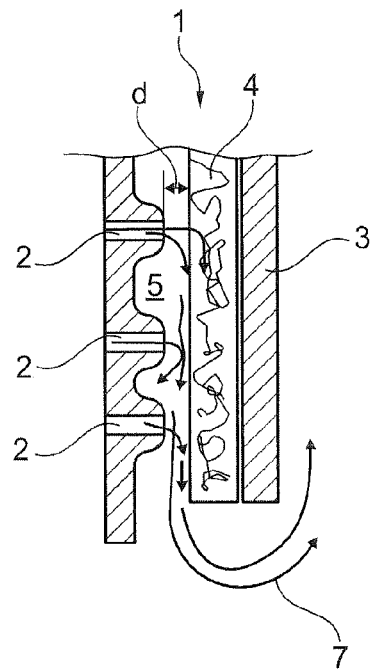
FIG. 1 shows a sectional view through an oil mist separator according to the invention.
Figure 2:
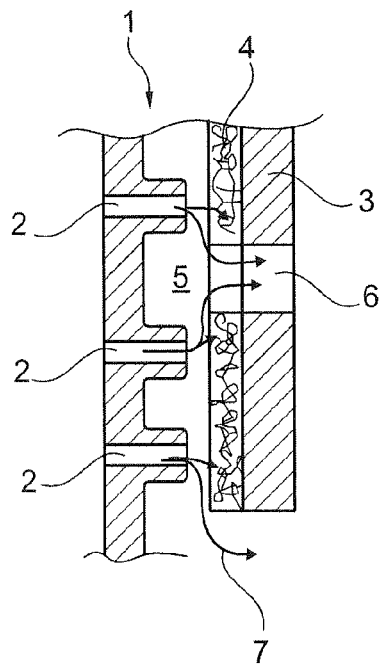
FIG. 2 shows an illustration as in FIG. 1, but for a different embodiment.
Figure 3:
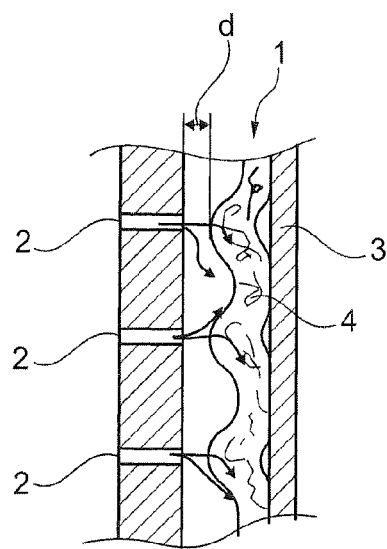
FIG. 3 shows an illustration as in FIG. 1, but for a further embodiment.

According to the FIGS. 1 to 3, an oil mist separator 1, in particular for a crankcase ventilation system, comprises a valve device having at least one nozzle 2, and according to the FIGS. 1 to 3, in each case three nozzles 2. Opposite to the nozzles 2, an impact wall 3 is arranged which is coated with a separation material 4, in particular with a fleece, a knitted material, or a meshed material. According to the invention, a distance d in the region of the nozzles 2 between the nozzles 2, this means between an outlet of said nozzles, and the separation material 4 is smaller than in a region 5 surrounding the nozzles 2. Hereby it is intended to enforce that the flow velocity in an oil mist separator 1 designed as an impactor decreases overall, and thereby, the separation effect is significantly improved.

As shown in FIG. 1, the impact wall 3 can be impermeable, or, as shown in FIG. 2, can be provided with passage openings 6 so that a blow-by gas flow 7 exiting from the nozzles 2 can flow around the impact wall 3 or can pass through the same at certain places.

When viewing the FIGS. 1 and 2, the reduced distance d in the region of the nozzles 2 to the separation material 4 is generated by nozzles 2 projecting towards the impact wall 3, that is, towards the separation material 4, whereas the reduced distance d in the region of the nozzles 2 according to FIG. 3 is generated by separation material 4 which projects in the region of the opposing nozzles 2 towards the same. Of course, a combination of both embodiments is also conceivable.

Figure 4:
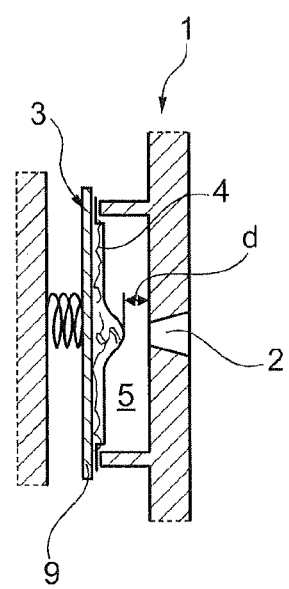
FIG. 4 shows an oil mist separator, wherein an impact wall is formed by a valve member of a bypass valve.

When viewing FIG. 4, here, the oil mist separator 1 is integrated in a valve device, wherein the impact wall 3 is formed by a valve member, in particular a valve plate 8. Similar to the impact walls 3 shown according to the FIGS. 1 to 3, the valve plate 8 is coated with separation material 4 which projects in the region of the nozzle 2 towards the same and thereby reduces the distance d of the nozzle outlet to the separation material 4 in this region compared to a surrounding region 5. In this case, the valve device is designed as a poppet valve, wherein, of course, further embodiments are also conceivable.

Due to the plurality of nozzles 2 arranged next each other, said nozzles, by interacting with the opposing impact wall 3, represent flow barriers which additionally slow down a blow-by gas flow 7 and thereby increase the separation effect. The blow-by gas flow 7 can flow here through the separation material 4 and also along the same, wherein the oil mist droplets aerosolically dissolved in the blow-by gas flow 7 are separated, collected, and usually are fed again to an oil reservoir arranged therebelow. Generally, such oil mist separators 1 are used in the region of a crankcase ventilation system so as to reduce an oil consumption of an internal combustion engine.

The invention claimed is:

1. An oil mist separator for a crankcase ventilation system in an internal combustion engine, comprising:
a nozzle device having at least one nozzle; and
an impact wall located opposite to the at least one nozzle and coated with a separation material,
wherein a first distance is configured between said nozzle and the separation material, which is less than a second distance spaced away from the nozzle in a surrounding region, and wherein the separation material in a region of the opposing nozzle projects towards the same to define the first distance between a nozzle outlet and the separation material compared to the second distance in the surrounding region spaced away from the nozzle outlet, and
wherein the separation material in the region projecting towards the at least one opposing nozzle defines a gap between the impact wall and the separation material, the gap covered in a direction away from the impact wall via the separation material.

2. The oil mist separator according to claim 1, wherein the separation material is at least one of a fleece, a knitted material, a fabric, or a meshed material.

3. The oil mist separator according to claim 1, wherein the at least one nozzle projects from the nozzle device towards the impact wall.

4. The oil mist separator according to claim 1, wherein the impact wall is formed by a valve member of a bypass valve.

5. The oil mist separator according to claim 4, wherein the bypass valve is a poppet valve.

6. The oil mist separator according claim 1, wherein the nozzle device has a plurality of nozzles which interact with the impact wall creating at least one flow barrier.

7. The oil mist separator according to claim 1, wherein the separation material in the region projecting towards the at least one opposing nozzle is contiguous with the surrounding region.

8. The oil mist separator according to claim 1, wherein the separation material is continuous.

9. An impact oil mist separator, comprising:
at least two nozzles each having a nozzle outlet;
an impact wall configured opposite to the at least two nozzles, wherein at least one nozzle projects towards the impact wall; and
a separation material configured between the at least two nozzles and the impact wall, wherein a first distance is configured between the nozzle outlets of the at least two nozzles and said separation material, which is less than a second distance in a surrounding region spaced away from the nozzle outlets of the at least two nozzles, and wherein the separation material in a region of the at least two opposing nozzles project towards the same to define the first distance between the nozzle outlets and the separation material compared to the second distance in the surrounding region spaced away from the nozzle outlet;
wherein the separation material in the regions projecting towards the at least two opposing nozzles is contiguous with the surrounding region;
wherein the separation material in at least one of the regions projecting towards the at least two opposing nozzles defines a gap between the impact wall and the separation material, the gap covered in a direction away from the impact wall via the separation material.

10. The impact oil mist separator according to claim 9, further comprising at least one passage opening configured in the impact wall, wherein the passage opening provides an exit path for a blow-by gas flow.

11. The impact oil mist separator according to claim 9, wherein the impact wall is impermeable.

12. The impact oil mist separator according to claim 9, wherein the impact wall is formed by a valve member of a bypass valve.

13. The impact oil mist separator according to claim 12, wherein the bypass valve is a poppet valve.

14. The impact oil mist separator according to claim 9, wherein the at least two nozzles interact with the impact wall creating at least one flow barrier.

15. The impact oil mist separator according to claim 9, wherein the at least two nozzles project towards the impact wall.

16. The impact oil mist separator according to claim 9, wherein the surrounding region is disposed between the at least two nozzle outlets.

17. The impact oil mist separator according to claim 9, wherein the separation material is continuous.

18. The impact oil mist separator according to claim 9, wherein the separation material in the regions projecting towards the at least two nozzles respectively include a gap between the impact wall and the separation material.

\* \* \* \* \*